United States Patent
Prakah-Asante et al.

(10) Patent No.: US 10,002,470 B2
(45) Date of Patent: Jun. 19, 2018

(54) METHOD AND APPARATUS FOR PREDICTIVE DRIVING DEMAND MODELING

(71) Applicant: Ford Global Technologies, LLC, Dearborn, MI (US)

(72) Inventors: Kwaku O. Prakah-Asante, Commerce Township, MI (US); Hsin-hsiang Yang, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 266 days.

(21) Appl. No.: 14/265,796

(22) Filed: Apr. 30, 2014

(65) Prior Publication Data

US 2015/0317847 A1    Nov. 5, 2015

(51) Int. Cl.
| | |
|---|---|
| *G07C 5/08* | (2006.01) |
| *B60W 40/00* | (2006.01) |
| *G08G 1/0962* | (2006.01) |
| *G07C 5/02* | (2006.01) |
| *G07C 5/00* | (2006.01) |

(52) U.S. Cl.
CPC ............ *G07C 5/08* (2013.01); *B60W 40/00* (2013.01); *G07C 5/02* (2013.01); *G07C 5/0841* (2013.01); *G08G 1/0962* (2013.01); *G07C 5/008* (2013.01)

(58) Field of Classification Search
CPC ..... B60T 8/172; G07C 5/008; B60R 16/0231; B60R 16/0315; B60G 17/0195
USPC ............... 701/22, 36–40, 80, 116–119, 29.1, 701/30.2–31.3, 32.1–32.5, 33.4–34.4
See application file for complete search history.

(56) References Cited

U.S. PATENT DOCUMENTS

| | | | |
|---|---|---|---|
| 6,092,005 A | 7/2000 | Okada | |
| 6,470,272 B2* | 10/2002 | Cong | G01S 13/723 340/436 |
| 6,487,477 B1 | 11/2002 | Woestman et al. | |
| 8,195,341 B2* | 6/2012 | Huang | B60W 30/12 701/1 |
| 8,280,601 B2* | 10/2012 | Huang | B60W 30/12 701/1 |
| 8,311,858 B2* | 11/2012 | Everett | G06Q 40/08 246/45 |
| 2003/0096594 A1* | 5/2003 | Naboulsi | B60R 11/02 455/411 |
| 2004/0209594 A1* | 10/2004 | Naboulsi | B60R 11/0264 455/404.1 |
| 2004/0225416 A1 | 11/2004 | Kubota et al. | |

(Continued)

*Primary Examiner* — Khoi H Tran
*Assistant Examiner* — Majdi Alsomiri
(74) *Attorney, Agent, or Firm* — Jennifer Stec; Brooks Kushman P.C.

(57) ABSTRACT

A system includes a processor configured to record vehicle inputs during travel over a predefined distance. The processor is also configured to record environmental variables during travel over the predefined distance. Further, the processor is configured to record vehicle state changes during travel over the predefined distance. The processor is additionally configured to compare the inputs, variables and state changes to predetermined values to determine if a correlation, indicating a predefined condition, exists. Also, the processor is configured to record the predefined condition as occurring over the predefined distance if the correlation indicates the predefined condition.

20 Claims, 11 Drawing Sheets

(56) References Cited

U.S. PATENT DOCUMENTS

| | | | |
|---|---|---|---|
| 2007/0027583 A1* | 2/2007 | Tamir | G06Q 30/0283 701/1 |
| 2007/0032913 A1* | 2/2007 | Ghoneim | B60W 30/16 701/1 |
| 2008/0051957 A1* | 2/2008 | Breed | B60R 21/01552 701/36 |
| 2010/0023223 A1* | 1/2010 | Huang | B60W 40/09 701/44 |
| 2010/0023245 A1* | 1/2010 | Huang | B60W 30/12 701/117 |
| 2010/0211270 A1* | 8/2010 | Chin | B62D 6/007 701/44 |
| 2013/0033384 A1* | 2/2013 | Pierlot | G08G 1/0104 340/905 |
| 2013/0079964 A1 | 3/2013 | Sukkarie et al. | |
| 2013/0096751 A1* | 4/2013 | Riley | B60L 3/12 701/22 |
| 2014/0046595 A1* | 2/2014 | Segawa | G01C 21/34 701/541 |
| 2014/0163848 A1* | 6/2014 | Tamir | G06Q 30/0283 701/117 |
| 2014/0236472 A1* | 8/2014 | Rosario | G01C 21/3602 701/400 |
| 2016/0159345 A1* | 6/2016 | Kim | B60K 35/00 701/36 |

\* cited by examiner

METHOD AND APPARATUS FOR PREDICTIVE DRIVING DEMAND MODELING

TECHNICAL FIELD

The illustrative embodiments generally relate to a method and apparatus for predictive driving demand modeling.

BACKGROUND

Telematics services have brought a whole new level of connectivity to a driver's in-vehicle experience. Drivers can access email, text messages, media, advertisements, remote applications and a variety of other functionality through connected vehicle services, as well as accessing navigation and more traditional in-vehicle services.

While this presents exciting opportunities and enhances the driving experience, automotive original equipment manufacturers have also taken steps to make telematics systems safe, so that drivers do not become overly distracted by the services available. Vehicles, or servers connected to the vehicles, are capable of estimating how much workload is being placed on a driver at a given time, and using this information to restrict access to services. A simple example is navigation functions being locked out when a vehicle is in motion, or above a certain speed.

U.S. Pat. No. 6,092,005 generally relates to a vehicle driving condition prediction device, a warning device using this prediction device, and a recording medium for storing data for prediction, wherein during use of the prediction function of an approach speed of the vehicle to a curve ahead, the acceleration at the present moment is maintained for a condition maintaining period of time, and thereafter the vehicle speed is slowed down at a fixed deceleration, and using such an assumed deceleration pattern a vehicle speed in future is predicted, by which a warning can be given taking the chances of driver's deceleration into consideration.

U.S. Pat. No. 6,487,477 generally relates to an on-board navigation system to provide energy management for an electric vehicle (EV) and a hybrid electric vehicle (HEV). The HEV control strategy of the present invention accommodates the goals of fuel economy while always meeting driver demand for power and maintaining the functionality of the traction motor battery system using battery parameter controllers. In the preferred embodiment of the present strategy, a vehicle system controller tightly integrates the navigation system information with energy management while en route to a known destination. Present vehicle location is continuously monitored, expectations of driver demand are determined, and vehicle accommodations are made. The system can be configured to includes as part of its present vehicle location data on road patterns, geography with date and time, altitude changes, speed limits, driving patterns of a vehicle driver, and weather. The vehicle accommodations can be configured to use discrete control laws, fuzzy logic, or neural networks.

U.S. Application Number 2013/079964 generally relates to a communication and analysis system that can manage data operations with a vehicle centric system with a planned route path. A vehicle that is in a communications link with a network can also manage its activities based on real time, historical and predictive knowledge, without having this all knowledge processing on board. Such data processing would include a cluster analysis of geo-spatial, internal functions and operator specific requirements. The rule based system would also incorporate the use patterns of a specific vehicle, or a specific user. A vehicle operator or vehicle multiple operators could share or upload information that would assist with efficient data processing and display, including fuel conservation and time management. Cluster weighting patterns can be assigned based on activities as efficient operation, safe travel and navigation.

SUMMARY

In a first illustrative embodiment, a system includes a processor configured to record vehicle inputs during travel over a predefined distance. The processor is also configured to record environmental variables during travel over the predefined distance. Further, the processor is configured to record vehicle state changes during travel over the predefined distance. The processor is additionally configured to compare the inputs, variables and state changes to predetermined values to determine if a correlation, indicating a predefined condition, exists. Also, the processor is configured to record the predefined condition as occurring over the predefined distance if the correlation indicates the predefined condition.

In a second illustrative embodiment, a computer-implemented method includes recording vehicle inputs during travel over a predefined distance. The method also includes recording environmental variables during travel over the predefined distance. Further, the method includes recording vehicle state changes during travel over the predefined distance. The method also includes comparing, via a computer, the inputs, variables and state changes to predetermined values to determine if a correlation, indicating a predefined condition, exists and recording the predefined condition as occurring over the predefined distance if the correlation indicates the predefined condition.

In a third illustrative embodiment, a non-transitory computer-readable storage medium stores instructions, which, when executed, cause the processor to perform a computer-implemented method comprising recording vehicle inputs during travel over a predefined distance. The method also includes recording environmental variables during travel over the predefined distance. Further, the method includes recording vehicle state changes during travel over the predefined distance. The method also includes comparing, via a computer, the inputs, variables and state changes to predetermined values to determine if a correlation, indicating a predefined condition, exists and recording the predefined condition as occurring over the predefined distance if the correlation indicates the predefined condition.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
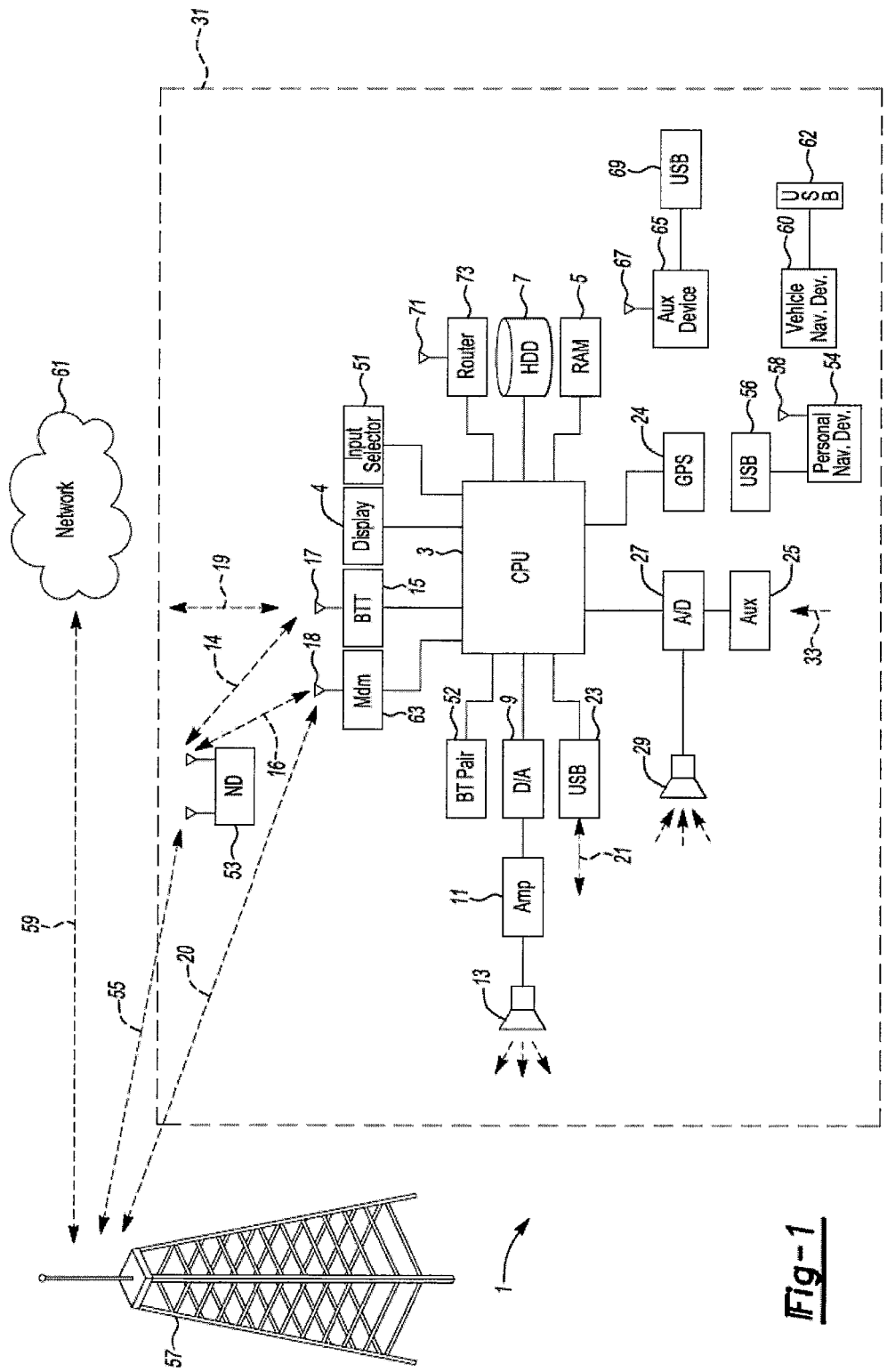
FIG. 1 shows an illustrative vehicle computing system.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, audible speech and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory.

The processor is also provided with a number of different inputs allowing the user to interface with the processor. In this illustrative embodiment, a microphone 29, an auxiliary input 25 (for input 33), a universal serial bus (USB) input 23, a global positioning system (GPS) input 24 and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous of the vehicle components and auxiliary components in communication with the VCS may use a vehicle network (such as, but not limited to, a controller area network (CAN) bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as personal navigation device (PND) 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, personal digital assistant (PDA), or any other device having wireless remote network connectivity). The nomadic device can then be used to communicate 59 with a network 61 outside the vehicle 31 through, for example, communication 55 with a cellular tower 57. In some embodiments, tower 57 may be a WiFi access point.

Exemplary communication between the nomadic device and the BLUETOOTH transceiver is represented by signal 14.

Pairing a nomadic device 53 and the BLUETOOTH transceiver 15 can be instructed through a button 52 or similar input. Accordingly, the central processing unit (CPU) is instructed that the onboard BLUETOOTH transceiver will be paired with a BLUETOOTH transceiver in a nomadic device.

Data may be communicated between CPU 3 and network 61 utilizing, for example, a data-plan, data over voice, or dual-tone multi-frequency (DTMF) tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include WiFi and have considerable cross-functionality with IEEE 802 PAN. Both are suitable for wireless communication within a vehicle. Another communication means that can be used in this realm is free-space optical communication (such as infrared data association (IrDA)) and non-standardized consumer infrared (IR) protocols.

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of with Code Domain Multiple Access (CDMA), Time Domain Multiple Access (TDMA), Space-Domain Multiple Access (SDMA) for digital cellular communication. These are all ITU IMT-2000 (3G) compliant standards and offer data rates up to 2 mbs for stationary or walking users and 385 kbs for users in a moving vehicle. 3G standards are now being replaced by IMT-Advanced (4G) which offers 100 mbs for users in a vehicle and 1 gbs for stationary users. If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., WiFi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (firewire), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a WiFi 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing the process, since the wireless device would not "send and receive" information with itself. One of ordinary skill in the art will understand when it is inappropriate to apply a particular VACS to a given solution. In all solutions, it is contemplated that at least the vehicle computing system (VCS) located within the vehicle itself is capable of performing the exemplary processes.

In each of the illustrative embodiments discussed herein, an exemplary, non-limiting example of a process performable by a computing system is shown. With respect to each process, it is possible for the computing system executing the process to become, for the limited purpose of executing the process, configured as a special purpose processor to perform the process. All processes need not be performed in their entirety, and are understood to be examples of types of processes that may be performed to achieve elements of the invention. Additional steps may be added or removed from the exemplary processes as desired.

Telematics services may be tailored to provide varied connectivity and options based on observed driving demand scenarios. The illustrative embodiments provide for prediction of specific driving type scenarios in a variety of instances. In addition to predicting areas of high driving demand, these embodiments may provide prediction of the various causes of demand based on scenarios (e.g., without limitation, high braking, high acceleration, frequent lane changes, likely merging vehicles, etc.). This information can further be used to tailor telematics services, both in terms of restriction of certain services and delivery or suggestion of services that may suit a particular driving scenario.

Regions where the driving demand and workload tends to be high are synergistically computed by learning over time, by fusing available latitude/longitude telematics information with computed real-time driving demand and workload information. Regions of high driving demand are recursively stored and updated based on the likelihood of occurrence.

In one illustrative PDDS, components include: a Driver Input Interaction Subsystem; Intervallic Driving Demand and Workload Subsystem; Driving Demand Likelihood Learning; Self-Tuning Predictive Driving Demand; and iHAC & DND Driver Personalized Interaction. The PDDS provides a predictive continuous index value of upcoming driving demand conditions for connected services information management. The iHAC real-time reminder features provide drivers with recommendations on predictive driving demand situations based on a learning system.

Using the illustrative embodiments and the like, VCS do not disturb (DND) may be automatically activated ahead of demanding driving conditions to mitigate potential driving distraction. Alert for the iHAC system may be provided utilizing existing vehicle outputs. This can be used to alert the driver of upcoming predicted high-demand situations, if desired. Through the learning approaches presented herein, minimal memory storage for real-time applications needs to be used. The PDDS and iHAC provide direct driver input for individual preferences for connectivity services and information management. Application developers can also utilize configurable messages provided to the iDND and iHAC for customizing messages to users.

The illustrative embodiments present systems and methods for driving demand scenario prediction based on driver behavior, scenarios experienced, and likelihood learning for driver connectivity delivery (DCD). The embodiments characterize and forecast oncoming scenarios (e.g., curves, intersections, etc.) and road conditions by recognizing, selecting and recording frequently repeated experiences at the same location(s). Based on forecasted scenario regions, connectivity information can be coordinated ahead of time. The predictive computation may be accomplished by fusing available GPS information with real time driving demand and scenario recognition. Regions of high demand may be recursively stored and updated based on the likelihood of a particular scenario's occurrence (based on observation, for example).

Figure 2:
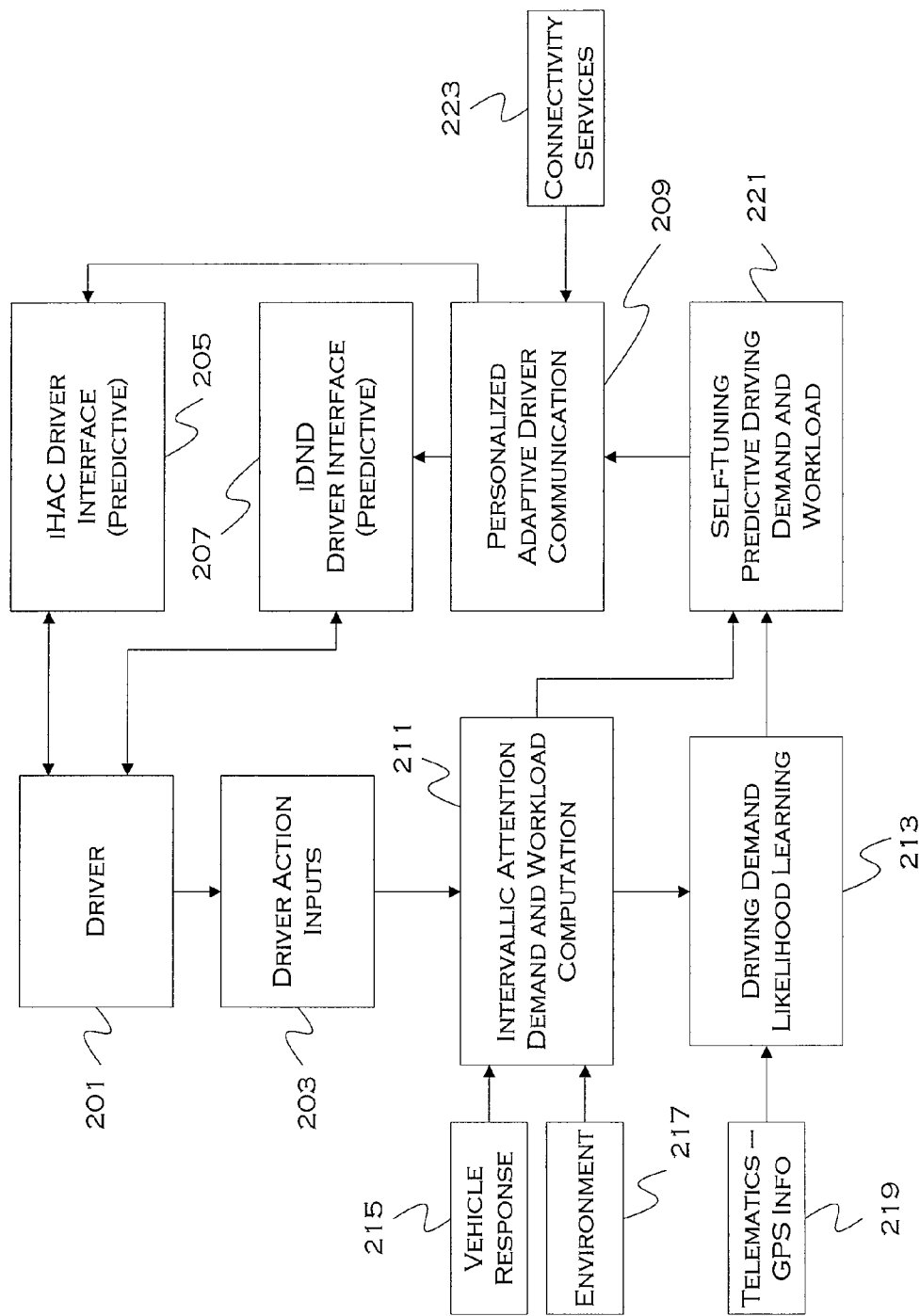
FIG. 2 shows an illustrative block diagram for predictive driving demand and services coordination.

FIG. 2 shows an illustrative block diagram for predictive driving demand and services coordination. This is an illustrative example of an embodiment of a system for PDDS. The system includes a module for intervallic attention demand and workload computation (ADWC) 211. This module receives inputs from the environment 217, vehicle responses 215 and driver action inputs 203 from a driver 201. These inputs help demonstrate and measure how much demand is placed on a driver at a given time. Environment information can include, but is not limited to, observed vehicles in proximity to the driver's vehicle, distances to observed vehicles, road conditions and other information about the area around the vehicle. Driver action inputs can include, but are not limited to, turning, frequency of steering adjustments, lane changes, braking, acceleration and other control inputs. Vehicle response information can include traction-control engagement, speed, pitch, slippage and other similar information.

The system also includes a driving demand likelihood (DDLL) module, which provides, adaptation and configuration of the likelihood of demand at a given location. This module receives inputs from telematics, such as GPS information 219, to determine locations at which the ADWC calculates high demand situations. The ADWC also provides inputs to this system, so that demand can be measured and observed at a given location.

This information is fed into a self-tuning and predictive driving demand workload (STDD) module 221. The STDD module can provide the predicted information to functions such as iDND and iHAC 207, 205. The intelligent systems and functions can then provide driver inattentiveness reducing services and to elevate driver focus when areas of likely high driving demand are upcoming. Connectivity services 223 feed into a personalized adaptive driver communication system 209 that can be used to control connectivity when areas of high driving demand are upcoming. Personalized driver communication can be provided based on the predicted driving demand and connected services information. The iHAC real-time reminder module can provide drivers with recommendations based on upcoming predicted driving demand situations as delivered from the learning system. Functions such as do not disturb (DND) can be intelligently activated ahead of demanding driving conditions from an iDND module.

Learning about possible high driving demand situations and storing those situations can be useful for the functionality of the PDDS systems and methods. High driving demand situations are commonly associated with high traffic density, lane changing, or road geometry. Other high driving demand situations may be associated with extreme weather, and the system could observe that a weather condition combined with a medium demand area may be likely to result in a high driving demand area. Since traffic, weather, and lane-changing vary with time and other drivers, the most commonly recurring predictable situation involves road geometry, as this does not typically change absent major construction.

The ADWC identifies driving demand situations as a driver progresses along a route. Among other things, the ADWC can determine not only driving demand, but possible causes of the demand as well. If certain high driving demand situations have a high enough likelihood of repetition, the DDLL system may record those situations automatically. Subsequently, when the driver approaches recorded high driving demand situations, the STDD can anticipate the driver's activity.

High driving demands due to road geometry have a high likelihood of repetition every time the driver is in the location where they occur. In addition, if a driver has a high workload every time in the same location, it is most likely to be a high driving demand location. Based on the frequency of high demand occurrence, the locations of high demand are identified. Once the likelihood of a location over time exceeds a tunable threshold, that location may be characterized as a high driving demand location for personalized driver adaptive communication.

The ADWC workload estimator (WLE) algorithms may run in real-time during vehicle trips to provide a WLE index that measures the demand over a given trip at given locations. If the WLE index exceeds a threshold at a particular location, the GPS coordinates relating to that location may be stored and an initial likelihood of high driving demand may be provided. For each of n locations i, the GPS coordinates L may be stored with respect to an initial likelihood $p_0$. This can be described by:

$$L_i(GPS_{lat}, GPS_{long}) = p_0 \text{ where } i = 1, \ldots, n$$

During each trip, if the vehicle drives through a similar range of GPS coordinates of $L_i$ and the vehicle has another high WLE above a threshold value, then:

$$L_{i+1}(GPS_{lat}, GPS_{long}) = \alpha \cdot L_i + (1-\alpha) \cdot p_0$$

Otherwise, if the WLE is below the threshold, then:

$$L_{i+1}(GPS_{lat}, GPS_{long}) = \alpha \cdot L_i$$

Where $\alpha$ is a decaying factor. Thus, if $p_0$ is the WLE_Index, then the WLE_above_threshold equation becomes:

$$L_{i+1}(GPS_{lat}, GPS_{long}) = \alpha \cdot L_i + (1-\alpha) \cdot \text{WLE\_Index}(i)$$

While the WLE_below_threshold will decay the value over time, indicating that the observed high WLE_Index is not commonly recurring.

In another illustrative embodiment, likelihood constants may be chosen for $p_0$ in the WLE_above_threshold equation such that:

$$p_0 = \begin{cases} \gamma \text{(initialization)} \\ \alpha \text{(update)} \end{cases}$$

Figure 3:
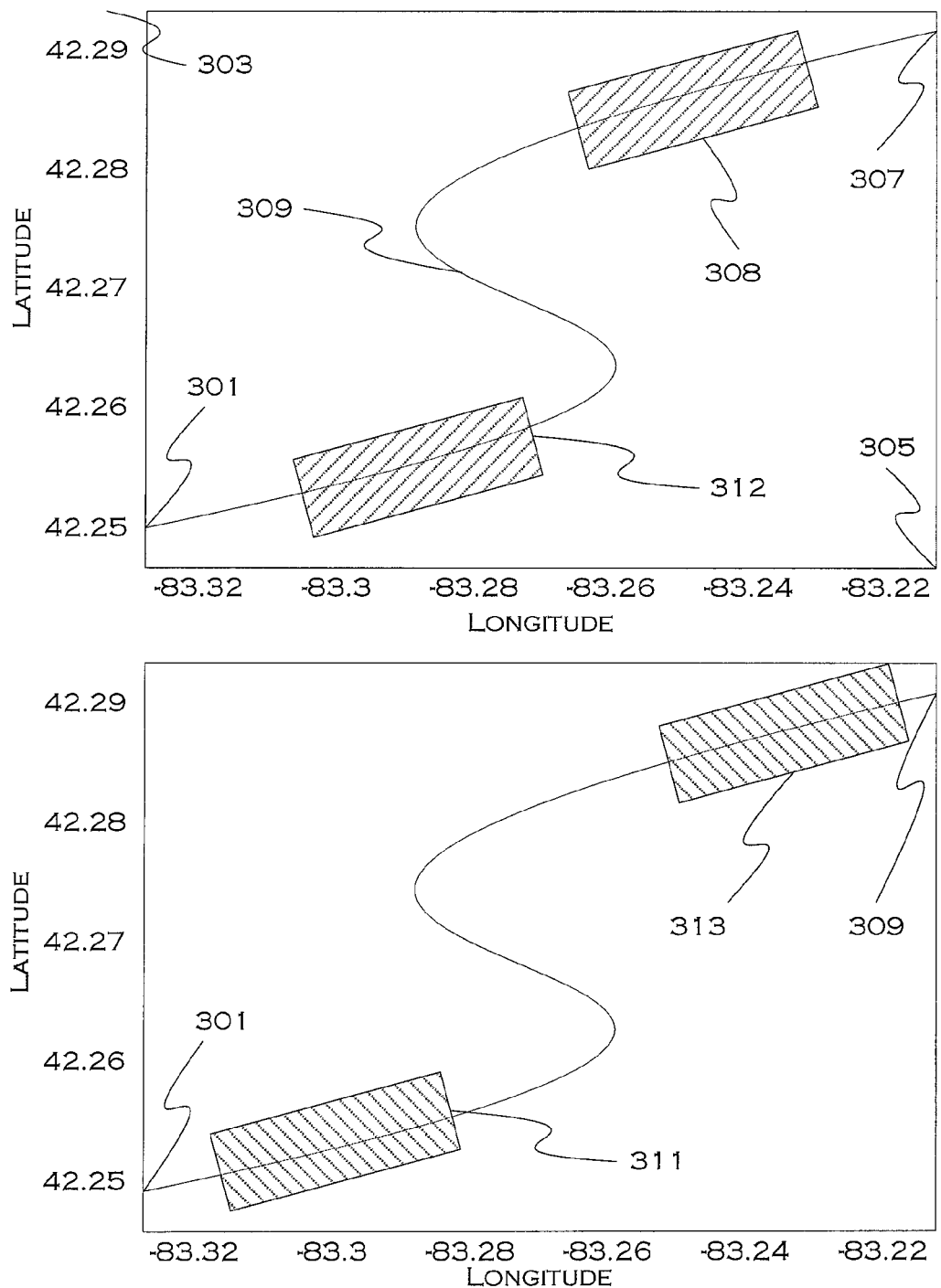
FIG. 3 shows several examples of predicted areas of demand along a route.

FIG. 3 shows several examples of predicted areas of demand along a route. The route may consist of local surface streets, arterial streets, and highways. An instrumented vehicle can be used for obtaining real-time data for evaluation. FIG. 3 shows two trips along the route, with highlighted high WLE locations.

The trip starts at location 301 and continues to location 307. The route 309 is designated between the points. Elements 312 and 308 mark areas of high WLE index. A grid defines the locations along the road and may be based on Latitude 303 and Longitude 305.

In the second trip, the elements 311 and 313 define the areas of high WLE index. As can be seen, 311 and 313 occur at different points on the second trip than areas 308 and 312 on the first trip. As the driver drives these routes repeatedly, this process will aggregate areas of high WLE indexes and these can be combined to determine frequently recurring areas of high WLE index.

Figure 4:
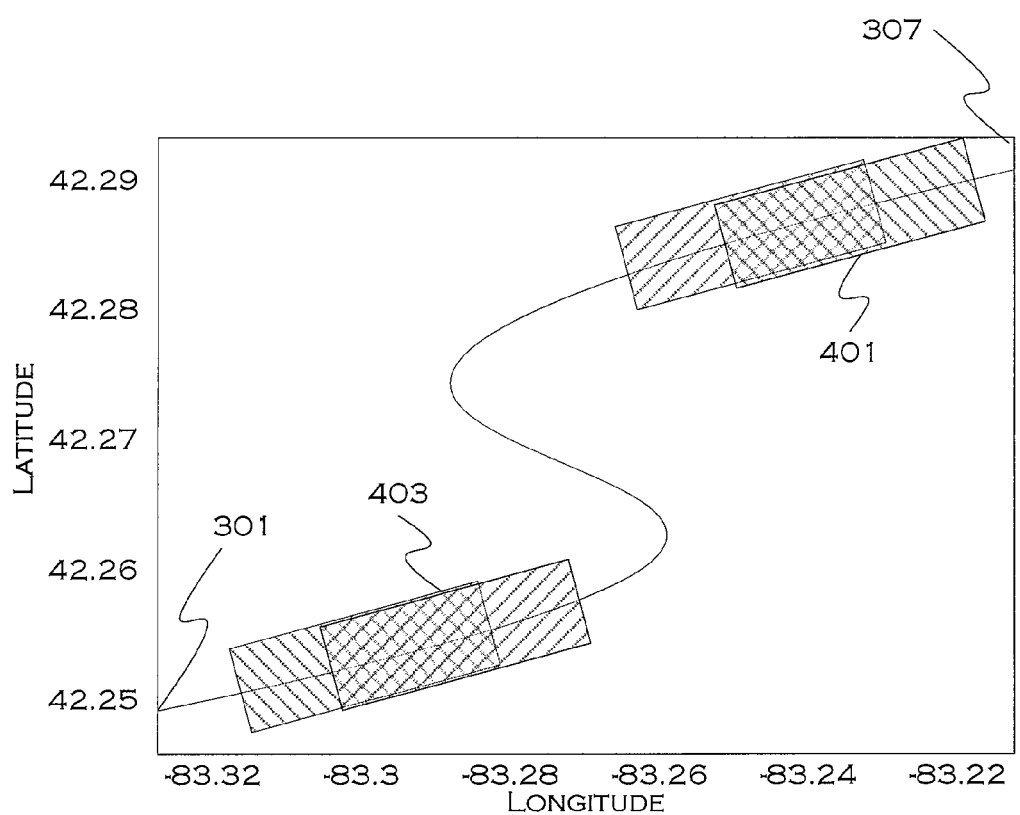
FIG. 4 shows a conflux of the predicted demand areas.

FIG. 4 shows a conflux of the predicted demand areas. This map 401 is an aggregate of the maps shown in FIG. 3. The areas 313 and 308 overlap at 401, and the areas 311 and 312 overlap at 403. The areas of overlap 401, 403 designate areas where high WLE indexes with increased computed likelihood of occurrence have occurred in both trips. As more trips are accrued, the process will be able to refine these areas with greater and greater degrees of distinction.

Whenever the likelihood $L_i$ reaches a designated tunable sensitivity level, the corresponding location is regarded as a high likelihood for driving demand. On the other hand, if $L_i$ drops below a threshold level, an area can be removed to save memory storage, or targeted for features which need information for potential low-demand scenarios.

The STDD and workload module provides advanced information about upcoming high demand situations. Whenever the likelihood $L_i$ reaches a designated tunable sensitivity level, the corresponding location is regarded as a high driving demand location for the driver and feature requirements.

Personalized adaptive driver communication (PADC) is provided based on the predicted driving demand and connected services information. The iHAC feature delivers personalize real-time reminders for drivers with recommendations on upcoming driving demand situations. The VCS DND feature can be automatically activated ahead of demanding driving conditions for select connected services.

Figure 5:
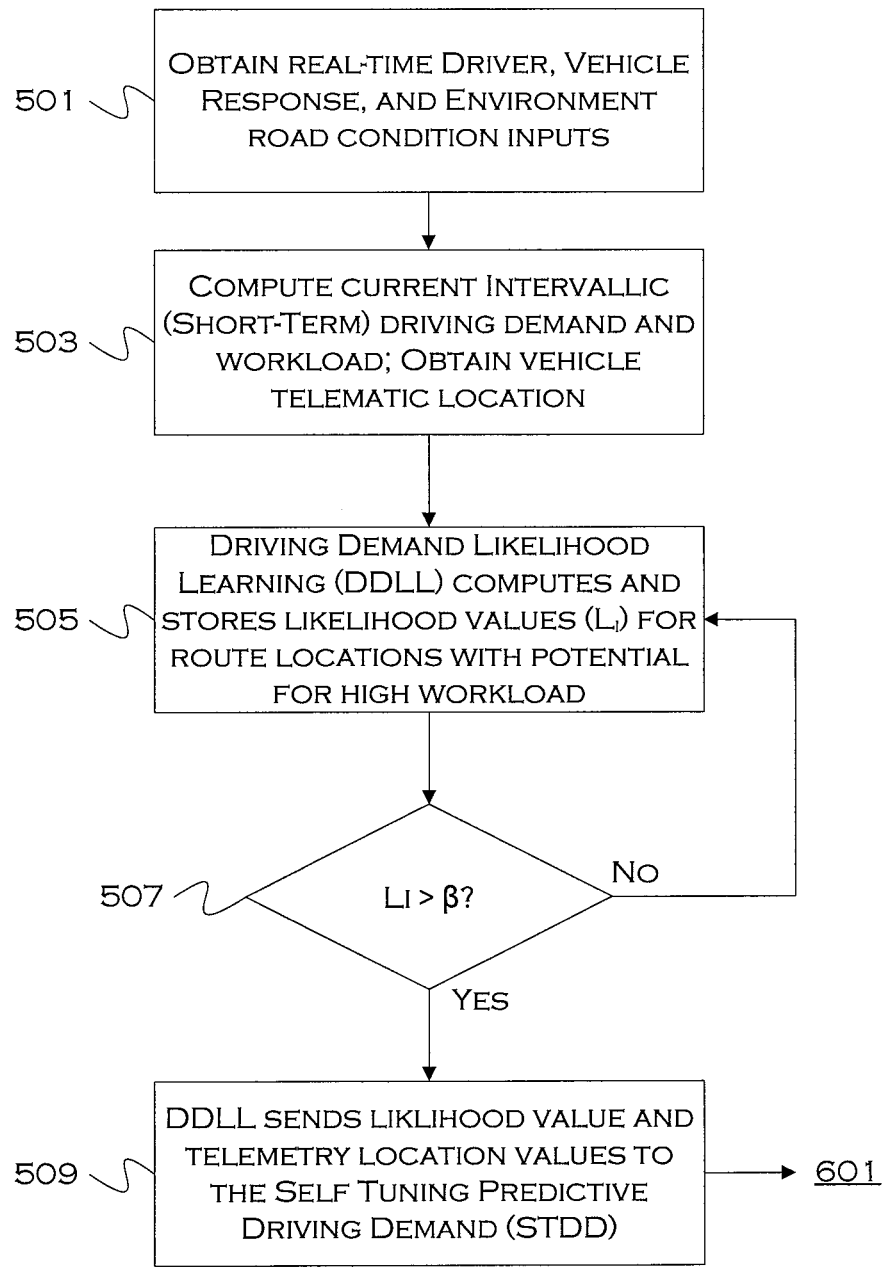
FIG. 5 shows an illustrative process for predicting driver demand.

FIG. 5 shows an illustrative process for predicting driver demand. In this illustrative embodiment, the process acts to gather information and predict areas of high driver demand. While the driver is traveling along the road, the process obtains real-time driver, vehicle response and environmental inputs 501. This information can be used to update the predictive calculations for areas along the route, so that future information can be delivered with a greater degree of accuracy.

Using vehicle telematic information and calculating short term workload 503, the process determines real-time demands for the vehicle's present location. This information is added to the collective, whenever the calculated WLE index is above a certain threshold. When the WLE_index is below the threshold, the likelihood factor for a given location degrades.

Driving demand likelihood learning (DDLL) may compute and store likelihood values for upcoming locations with a potential for high workload 505. This information is based on the previously observed information from previous trips along the route. If $L_i$ is above a threshold value β the process sends the likelihood value and telemetry location to the STDD 509.

Figure 6:
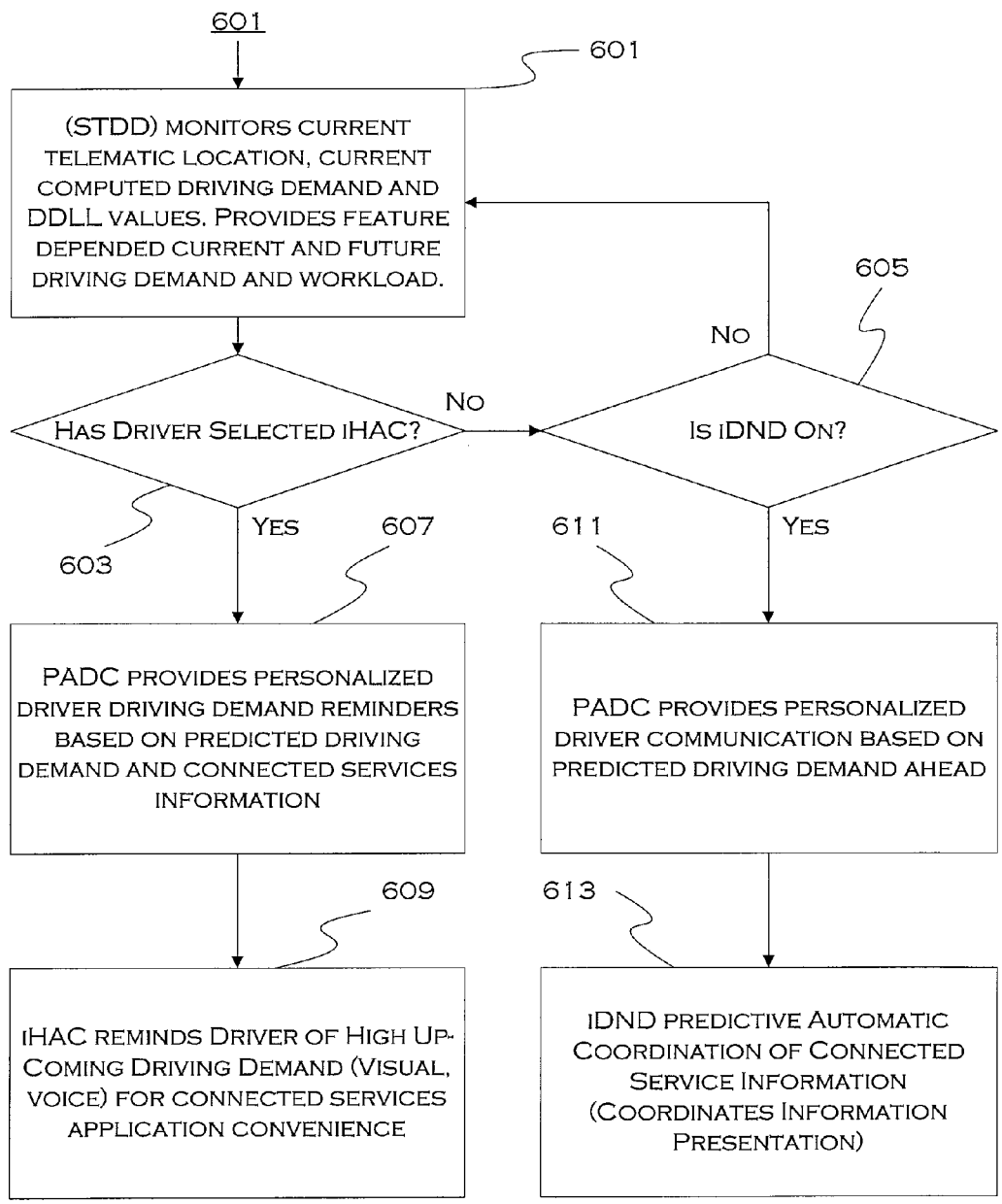
FIG. 6 shows an illustrative process for integrating predicted demand with delivered services.

FIG. 6 shows an illustrative process for integrating predicted demand with delivered services. In this example, the STDD receives $L_i$ when $L_i$ is above the threshold value. The STDD monitors current telematic locations, current computed driving demand and DDLL values. The STDD can also provide feature dependent current and future driving demand and workload values based on information received from the other modules 601.

If there is a high index value for a given location, the process determines if the driver has selected iHAC. As previously noted, iHAC provides warnings and alerts to drivers for upcoming areas of high likelihood 603.

If iHAC is enabled, the PADC can provide personalized driver demand reminders 607. These reminders can be based on predicted driving demand and connected services information. For example, the system may alert a driver that certain connected services will not be available in an upcoming area, so that the driver could utilize the connected services while they were still available. The iHAC can also provide reminders about connected services, such as warnings that touch capability may not be available 609.

Similarly, the process may check to see if iDND is enabled 605. Again, PADC can provide personalized driver demand reminders 611. iDND can automatically enable do not disturb functionality for areas of high demand 613.

While the iHAC and iDND services are shown as exemplary services that may be employed in instances of high demand, any number of services may be implemented. Typically, these services will relate to reducing possible driver inattentiveness, elevating driver focus, providing driver convenience, and increasing safety.

Figure 7:
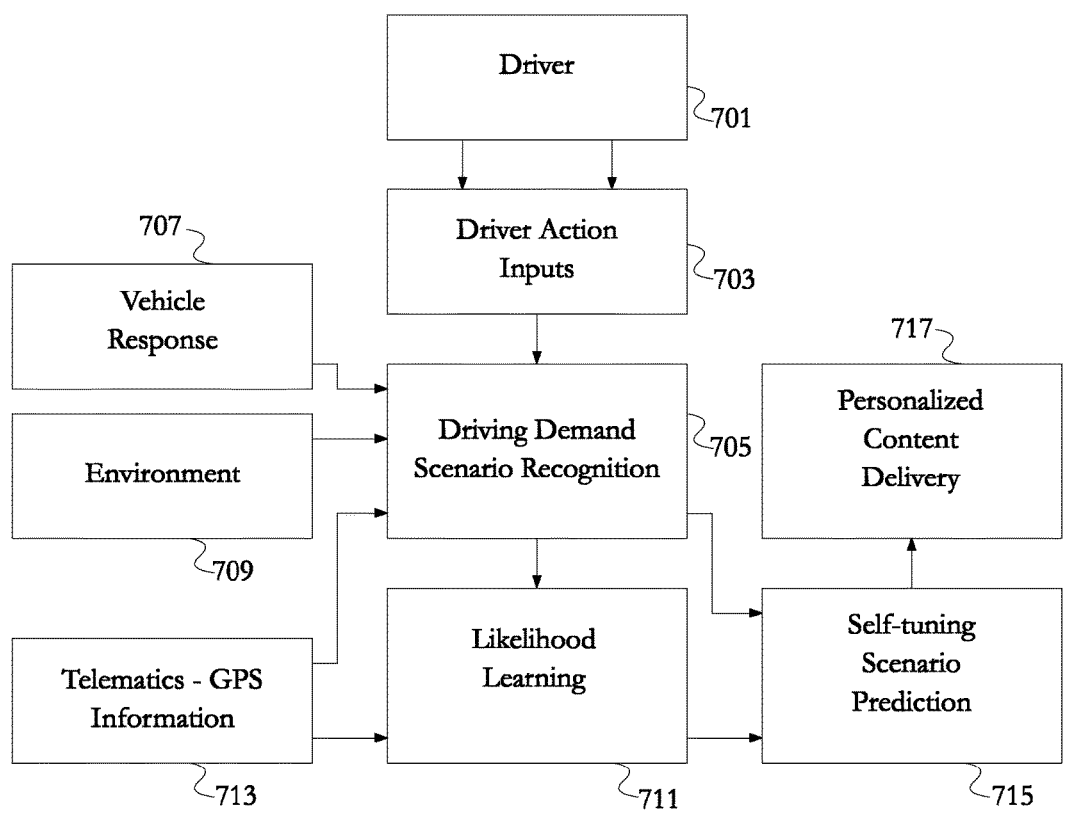
FIG. 7 shows an illustrative example of a driving demand learning and prediction system.

FIG. 7 shows an illustrative example of a driving demand learning and prediction system. In this illustrative example, the system includes a driver 701 interacting with the vehicle to provide driver action inputs 703. These can include, but are not limited to, acceleration, braking, steering, etc. They may also include usage of one or more vehicle telematics services.

These inputs are aggregated as part of a driving demand scenario, which is a snapshot (possibly over some finite period of time) of the factors adding to the workload of the driver 705. Also included in the scenario are environmental information 709 (e.g., without limitation, weather, traffic, road conditions and features, etc.) and vehicle responses 707. Telematics information, such as GPS information 713, for example, may also be used to identify where the scenario is occurring.

The observed scenario is fed into a likelihood learning algorithm 711, which can iteratively learn the likelihood of a scenario over a given coordinate set. That is, if the scenario (or a scenario within threshold parameters of the observed scenario) occurs frequently at certain coordinates, the process will begin to recognize the likelihood of occurrence over time. More than just predicting that a driver will likely experience a high workload at a given location, this can serve to predict why a driver will experience the high workload. This information can be fed into a self-tuning scenario prediction process 715, for long-term tracking of the scenarios, and use of the process when the location and factors are later encountered can provide a personalized driver connectivity delivery solution 717.

Figure 8A:
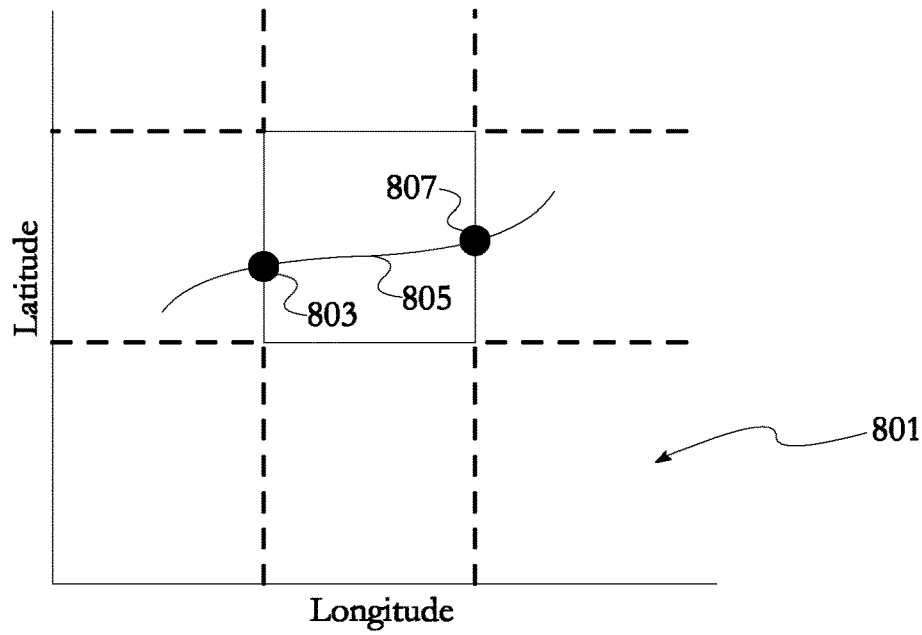
FIG. 8A shows an illustrative example of a driving scenario.

FIG. 8A shows an illustrative example of a driving scenario 801. In this illustrative example, a set of coordinates ranging from a start point 803 to an end point 807 is examined. Driving behavior, environmental factors, and other data provides an observed scenario over the portion of the route examined 805.

Figure 8B:
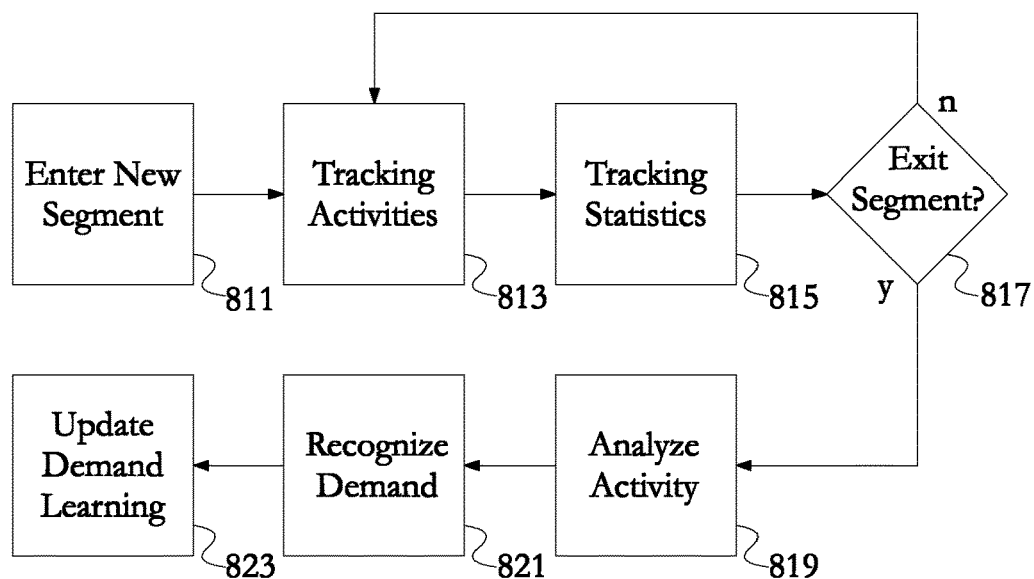
FIG. 8B shows an illustrative example of a driving demand tracking process.

FIG. 8B shows an illustrative example of a driving demand tracking process. With respect to the illustrative embodiments described in this figure, it is noted that a general purpose processor may be temporarily enabled as a special purpose processor for the purpose of executing some or all of the exemplary methods shown herein. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

In this illustrative example, the process observes that the driver has entered a new route segment 811. In the illustrative examples, driving scenarios are observed over finite coordinate sets representing a total route. Coordinates can be divided as appropriate, depending on how finely tuned the system is desired to be. Smaller ranges between start and end points for coordinates will result in smaller snapshots, providing more finely tuned data for a given route.

Once the driver has entered the new segment, the process will track, for that segment, driver activities 813. The process will also track environmental conditions and vehicle states 815. This, along with any other appropriate information, will be used to provide a comprehensive picture of both the conditions leading to a scenario and the driver's reactions to these conditions. Once the driver exits the segment 817, the process can analyze the activity over the coordinate set 819.

This information can be used to recognize demand over the coordinate set for the observed scenario 821, as well as recognizing what type of driver behavior and environmental conditions lead to the increased demand. This information can then be used to update driver demand learning 823, so that future scenarios can be predicted at this location.

Figure 9A:
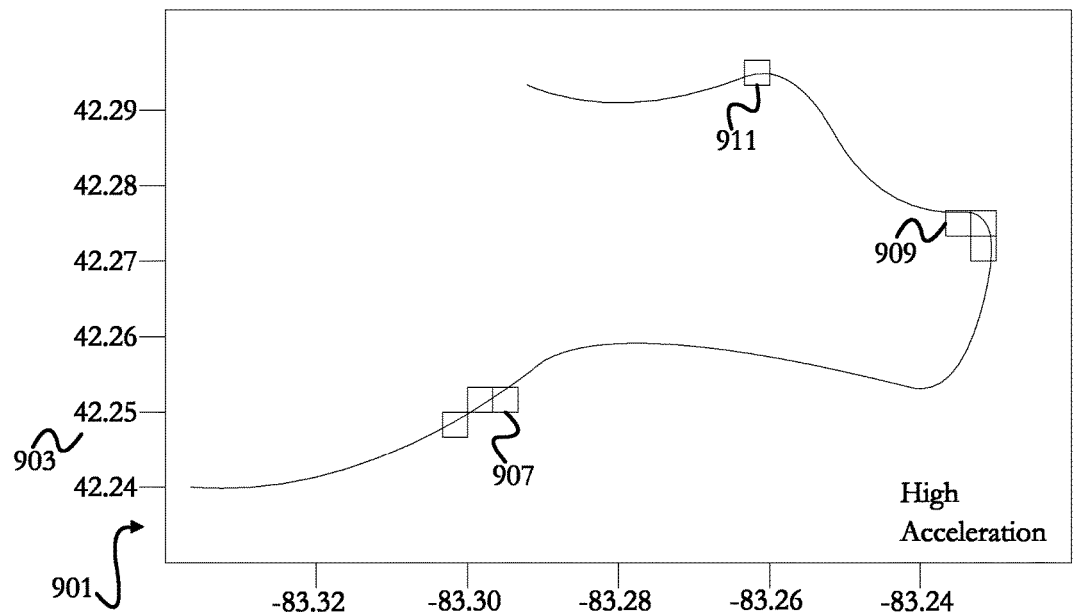
FIGS. 9A and 9B show illustrative examples of high driver workload instance tracking.
Figure 9B:
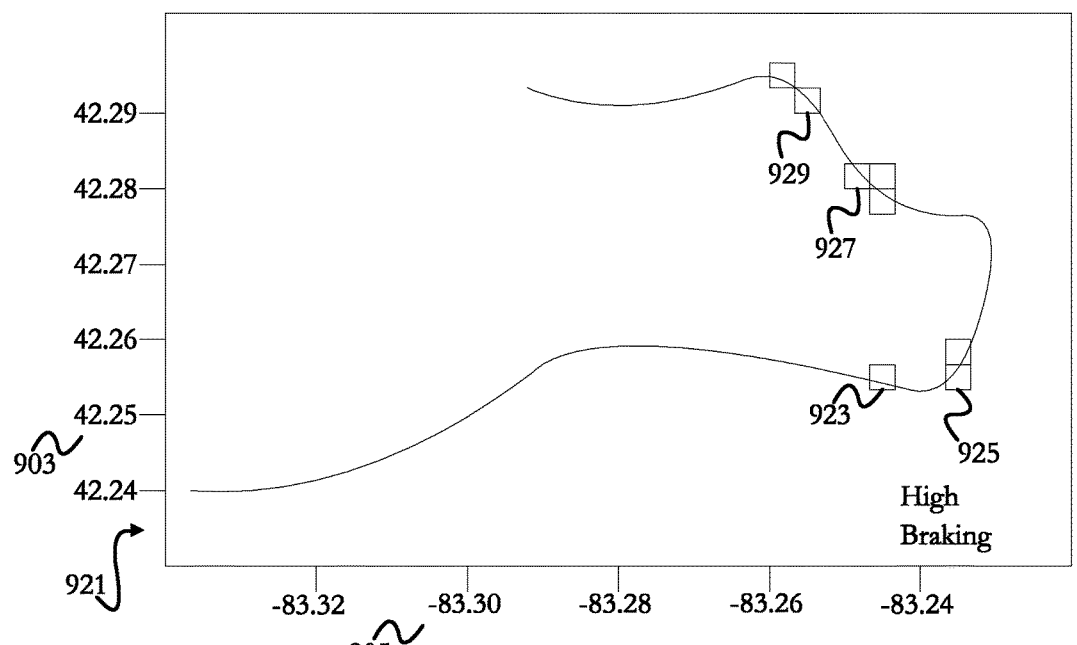

FIGS. 9A and 9B show illustrative examples of high driver workload instance tracking Unlike FIGS. 3 and 4, these figures show not just areas of high demand, but why the demand increases. So, for example, if seven different demand scenarios occurred along a route, FIGS. 3 and/or 4 might be used to show the route with "any" demand predicted, whereas FIGS. such as 9A and 9B might show smaller instances of demand based on particular conditions and reasons for demand.

In FIG. 9A, areas of high acceleration are shown 901. Along the latitude 903 and longitude 905 coordinates, individual portions of the route are observed to have areas of increased acceleration 907, 909, 911. This information can be used to provide services and/or limit access to services based on recommended action for high-acceleration areas. For example, without limitation, if a route were known to have traffic cameras that recorded incidents of speeding, and an application notified drivers of the occurrence of these cameras, such an application might be engaged over areas of observed high acceleration to ensure that drivers didn't exceed the speed limit in these areas.

In FIG. 9B, areas of high braking are shown 921. This could result from, for example, merge areas 925, areas of high traffic 923, or sharp turns 927, 929. Since data relating to traffic, merging, and road shapes and conditions is known, in conjunction with the scenarios, this data can not only predict demand, but predict that the demand is due to braking in these areas, and even predict why braking will occur. In areas where the braking is due to road shape, the demand will probably be generally constant, although slower entry speeds could lead to a reduction in braking. In areas where the braking is due to traffic, the process may recognize that traffic must be present for the demand to increase. Thus, the scenarios can be based both on constant and variable factors.

Figure 10:
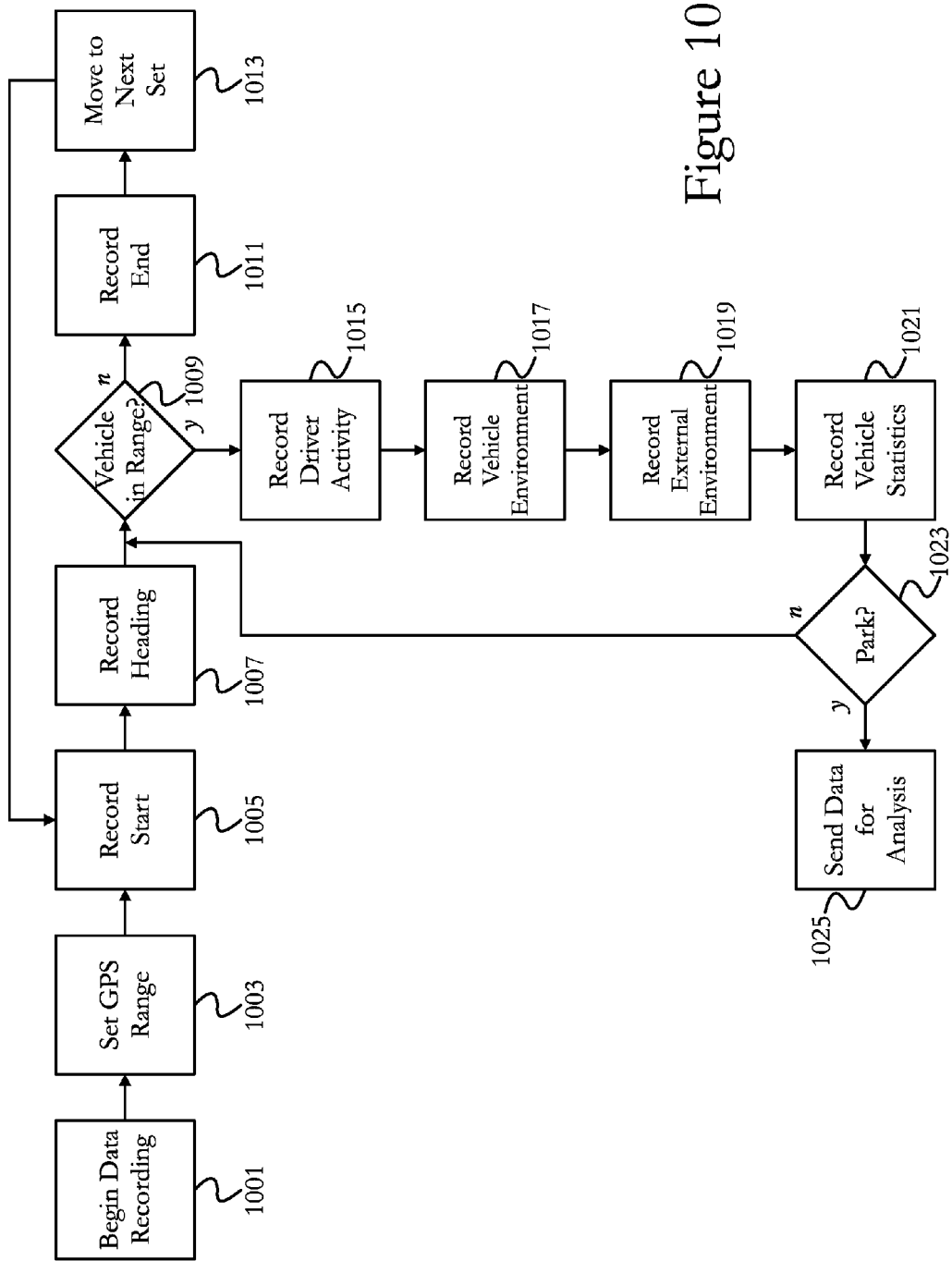
FIG. 10 shows an illustrative example of driving workload tracking.

FIG. 10 shows an illustrative example of a driving workload tracking process. With respect to the illustrative embodiments described in this figure, it is noted that a general purpose processor may be temporarily enabled as a special purpose processor for the purpose of executing some or all of the exemplary methods shown herein. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

In this illustrative example, the process records data as the driver passes through coordinate sets along a route, providing for analysis and updating of scenario models for each coordinate set. This can be done using a decaying function, which allows for decay of high-frequency incidences if they diminish over time. For example, if a road was expanded from two lanes to four, driving demand due to traffic may diminish over time.

Driving demand and scenario recognition processes can monitor driver activities (e.g., steering wheel angle, pedals, etc.) and vehicle states (acceleration, yaw-rate) over a set of coordinates. Once the activities and states match a predefined driving scenario (e.g., without limitation, high braking, high turning, high acceleration), the GPS location can be labeled and sent to a learning module. Some non-limiting examples of scenarios that may be recorded include, but are not limited to, high acceleration (recognized, for example, by acceleration pedal depress of a certain magnitude and/or longitudinal acceleration being over a threshold), high braking (recognized, for example, by brake pedal depress of a certain magnitude and/or longitudinal deceleration being over a threshold), intersection (recognizable, for example, by yaw-rate integrated along a trajectory of the route-fragment being approximately 90 degrees), merge situations (recognizable, for example, by lateral motion and speed exiting the route segment minus speed entering the route segment being over a threshold), road roughness over a threshold, sharp curves, etc.

Driving demand and scenario likelihood learning algorithms can be run in real time during trips and provide scenario recognition. If a performance driving demand scenario or road condition in a particular location (i) is recognized, the GPS coordinates L may be stored with respect to an initial likelihood $p_0$. This can be described by:

$$L_i(GPS_{lat}, GPS_{long}) = p_0 \text{ where } i=1, \ldots, n$$

Where n is the number of locations recognized.

During each trip, if the vehicle drives through a similar range of GPS coordinates of $L_i$ and the same scenario has been recognized, then:

$$L_{i+1}(GPS_{lat}, GPS_{long}) = \alpha \cdot L_i + (1-\alpha) \cdot p_0, = 1, \ldots n$$

Otherwise, if the WLE is below the threshold, then:

$$L_{i+1}(GPS_{lat}, GPS_{long}) = \alpha \cdot L_i, i=1, \ldots n$$

Where $\alpha$ is a decaying factor.

In another illustrative embodiment, likelihood constants may be chosen for $p_0$ in the WLE_above_threshold equation such that:

$$p_0 = \begin{cases} \gamma \text{(initialization)} \\ \alpha \text{(update)} \end{cases}$$

In the illustrative process shown in FIG. 10, data recording for a given segment begins 1001. The GPS range is set over which the data will be recorded 1003 (defining a route segment, having entry and exit points) and the recording begins 1005. A vehicle heading may also be recorded 1007, for example, so that the information can be saved with respect to a vehicle traveling in a particular direction. That is, if traffic is causing the scenario, the traffic may occur only in one direction at a particular time of day.

While the vehicle is still within a particular coordinate range, the process will continue to record data for that coordinate range 1009. Once the vehicle has left the coordinate range, the process will end the recording 1011 and move to the next coordinate set 1013.

In this illustrative example, a number of exemplary instances of data are recorded for the coordinate set. These datum can be used to identify particular scenarios. They may also be used to define new scenarios, for example, if high demand is recognized and no particular paradigm for such demand is currently defined. In this example, the process records driver activity as one data set 1015. This can include, but is not limited to, steering and pedal usage. For example, frequent uses of an accelerator or brake, as well as frequent changes in steering wheel direction or a high change in a single steering wheel direction can indicate certain scenarios with thresholds for these conditions predetermined. This data can also be used to recognize generalized high driver demand.

Vehicle environmental data may be recorded 1017, to determine if the driver is likely to be distracted based on internal vehicle environments. This could, for example, be due to a number of passengers above a threshold, or a number of young passengers above a threshold.

External environmental data, such as, but not limited to, road conditions, weather, traffic, etc. can also be recorded 1019. This data can tend to indicate whether the scenario is likely to be constant (e.g., sharp turn) or variable (e.g., traffic based). The data can also be used to predict whether or not the scenario will be encountered again in the future. Vehicle states may be further recorded, which can indicate yaw rates, acceleration, deceleration, etc. 1021. This data can also be compared to previously observed scenarios to determine whether or not a given scenario is about to be repeated.

Also, if the vehicle enters a park state during this segment 1023, it is assumed the drive is over. At this point, all gathered data can be sent for analysis 1025. In other instances, the data can be sent in real time, or when a segment has ended. Gathering this data over the segments can help refine likely scenarios for the segment. Recursive gathering provides a model of the data over time. And decay factors can be introduced to degrade this likelihood if the observed scenario likelihood diminishes.

Figure 11:
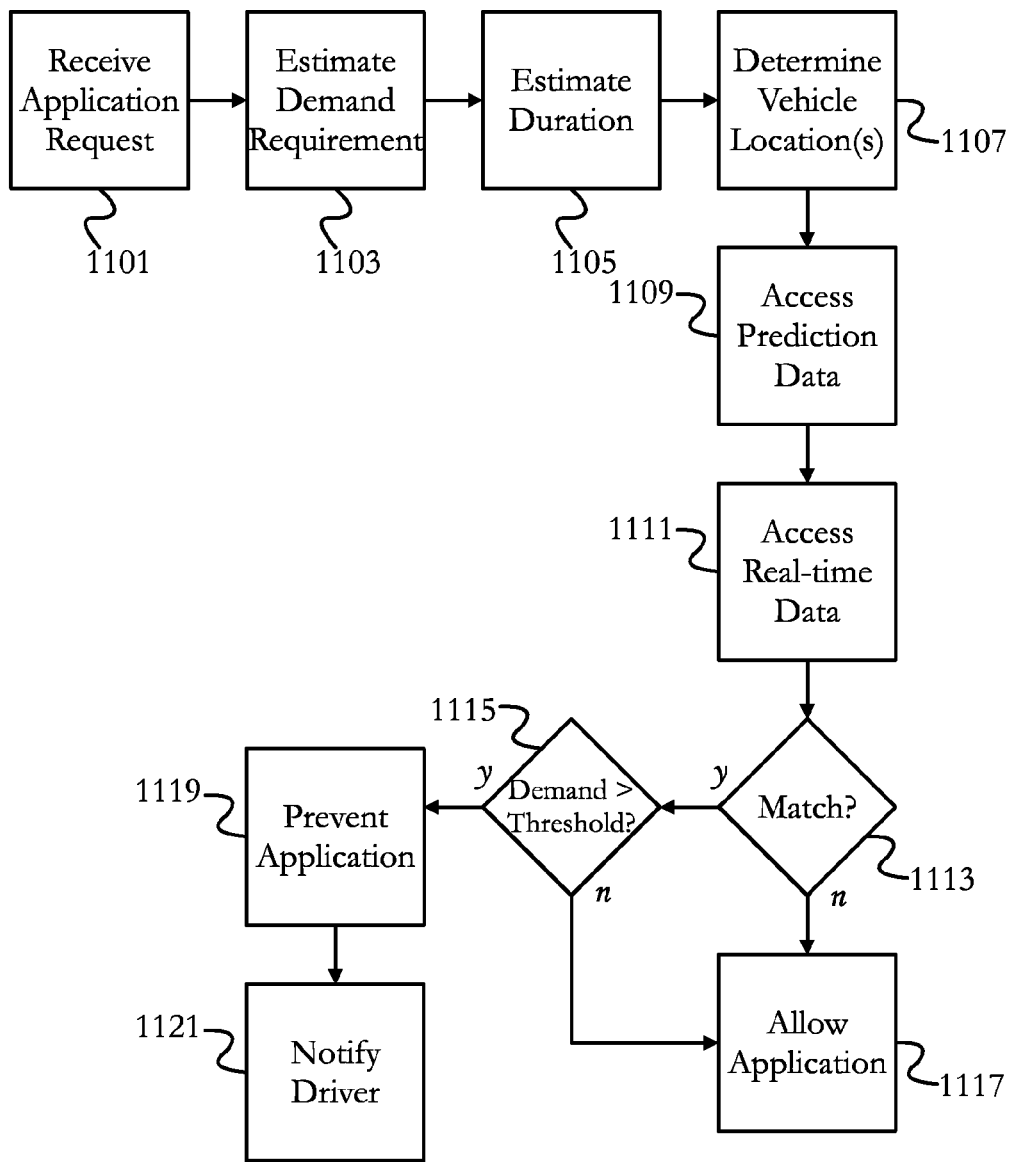
FIG. 11 shows an illustrative example of a process utilizing driving demand prediction.

FIG. 11 shows an illustrative example of a process utilizing driving demand prediction. With respect to the illustrative embodiments described in this figure, it is noted that a general purpose processor may be temporarily enabled as a special purpose processor for the purpose of executing some or all of the exemplary methods shown herein. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

In this illustrative example, the process is used to determine whether or not to permit usage of an application based on upcoming demand. Since a particular application may require a certain amount of driver attention, be used for a certain period of time, and require certain services, the process may wish to know what scenarios are upcoming.

If, for example, a high demand situation is approaching, the process may restrict usage of applications whose usage may generally overlap the time during the driver demand. In other instances, not shown, certain services may be implemented or resources may be allocated based on anticipated demand. As previously shown, do not disturb functions can also be automatically engaged.

In this illustrative example, the process receives a request to utilize a particular application 1101. Based on this request, an estimation of driver demand required by the application is determined 1103. This could be based on, for example, a degree of observed driver interaction (number of button presses, amount of output information, etc) with the application in previous instances. An estimation of time for usage of the application may also be determined 1105. This can be based on, for example, previously observed durations of usage.

Based on vehicle speed, traffic, heading, and/or route, the process may also determine the likely locations of the vehicle during the duration of usage 1107. This can be used to determine which locations should be observed for predictions of driver demand. Variable factors such as traffic can be preemptively considered at these locations, and estimates of particular scenarios can be made. Thus, incidences of likely high demand can be recognized before they are actually encountered.

In this example, the process accesses stored prediction data for the identified locations during which the requested application is likely to be in use 1109. The prediction data provides the basis for which scenarios to consider for a given upcoming location of possible high demand. Also, real-time data can be accessed 1111, which can include driver identity, driving behavior data, vehicle environment, external environment, and any other known data that may be useful in identifying the scenario. This data can be compared to the stored prediction data to see if a likely situation is upcoming which will require increased driver attention.

If a match does not exist between existing conditions and any of the modeled scenarios (e.g., there is not enough positive data indicating a scenario as previously observed), the process may allow the application 1117. If a match exists 1113, the process may determine if an increased driver attention likelihood is above a threshold level 1115. For example, given a current set of variables, it may be the case that, under these conditions, increased attention is only recognized 5% of the time. In such a case, the application may also be allowed.

On the other hand, if there is a threshold likelihood of increased attention demands 1115, the process may prevent usage of the application 1119. Or, in another example, the process may block or free certain resources, prepare certain connections, or take other appropriate behavior based on a predicted scenario type. The driver also may be notified as to what action is being taken 1121, so that the driver understands why a certain feature was prevented or engaged.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system comprising:
a processor configured to:
  record vehicle inputs, environmental variables and vehicle state changes during travel over a predefined distance;
  compare the recorded inputs, variables and state changes to predetermined values to determine that a correlation, indicating driving demand above a threshold, exists; and
  automatically engage a vehicle safety measure to block a predefined instance of blockable, demand-increasing information from being presented to a driver, responsive to determining the demand above the threshold.

2. The system of claim 1, wherein the predefined distance includes a predetermined coordinate set.

3. The system of claim 1, wherein the inputs include pedal usage.

4. The system of claim 1, wherein the inputs include steering wheel usage.

5. The system of claim 1, wherein the environmental variables include weather.

6. The system of claim 1, wherein the environmental variables include traffic.

7. The system of claim 1, wherein the environmental variables include road conditions.

8. The system of claim 1, wherein the vehicle state changes include acceleration rates, including deceleration rates.

9. The system of claim 1, wherein the vehicle state changes include yaw rates.

10. A computer-implemented method comprising:
    recording vehicle inputs, environmental variables, and vehicle state changes during travel over a predefined distance;
    comparing, via a computer, the inputs, variables and state changes to predetermined values to determine that a correlation, indicating driving demand above a threshold, exists; and
    notifying a driver of a high demand situation responsive to the determinization that demand above the threshold exists.

11. The method of claim 10, wherein the predefined distance includes a predetermined coordinate set.

12. The method of claim 10, wherein the inputs include pedal usage.

13. The method of claim 10, wherein the inputs include steering wheel usage.

14. The method of claim 10, wherein the environmental variables include weather.

15. The method of claim 10, wherein the environmental variables include traffic.

16. The method of claim 10, wherein the environmental variables include road conditions.

17. The method of claim 10, wherein the vehicle state changes include acceleration rates, including deceleration rates.

18. The method of claim 10, wherein the vehicle state changes include yaw rates.

19. A non-transitory computer-readable storage medium, storing instructions, which, when executed, cause a processor to perform a computer-implemented method comprising:
    recording vehicle inputs, environmental variables, and vehicle state changes during travel over a predefined distance;
    comparing, via a computer, the inputs, variables and state changes to predetermined values to determine that a correlation, indicating driving demand above a threshold, exists; and
    automatically engaging a vehicle safety measure to block a predefined instance of blockable, demand-increasing information from being presented to a driver, responsive to determining the demand above the threshold.

20. The storage medium of claim 19, wherein the predefined distance includes a predetermined coordinate set.

* * * * *